United States Patent [19]

Thurenius et al.

[11] Patent Number: 4,610,504
[45] Date of Patent: Sep. 9, 1986

[54] FIBRE-OPTIC SWITCHING MEANS

[75] Inventors: Åke G. H. Thurenius, Skärholmen; Viesturs J. Vucins, Älta, both of Sweden

[73] Assignee: Telefonaktiebolaget LM Ericsson, Stockholm, Sweden

[21] Appl. No.: 503,743

[22] Filed: Jun. 13, 1983

[30] Foreign Application Priority Data

Jul. 1, 1982 [SE] Sweden .................... 8204085

[51] Int. Cl.[4] ........................... G02B 6/38
[52] U.S. Cl. ..................... 350/96.20; 350/96.21
[58] Field of Search .............. 350/96.20, 96.21, 96.22

[56] References Cited

U.S. PATENT DOCUMENTS 4,146,856  3/1979  Jaeschke ............... 350/96.2
4,189,206  2/1980  Terai et al. ........... 350/96.20
4,204,744  5/1980  Wittmann .............. 350/96.2

FOREIGN PATENT DOCUMENTS 1119031  3/1982  Canada .
2030319  5/1980  United Kingdom .

Primary Examiner—William L. Sikes
Assistant Examiner—Lester Rushin, III
Attorney, Agent, or Firm—Roberts, Spiecens & Cohen

[57] ABSTRACT

A fibre-optical relay for switching optical signals between signal paths contains a fixed first holder (12) with parallel optical fibres (13, 14, 15) and a movable slide (8), similarly with parallel optical fibres (19, 20, 21). The slide can be displaced by an actuating arm (7) at right angles to the axial direction of the fibres from an initial position to a final position situated at a fibre spacing (d) from each other. The fibres (19, 20, 21) on the slide (8) are further arranged in a fixed second holder (16) displaced in the transverse direction of the fibres by half a fibre spacing (d/2).

10 Claims, 4 Drawing Figures

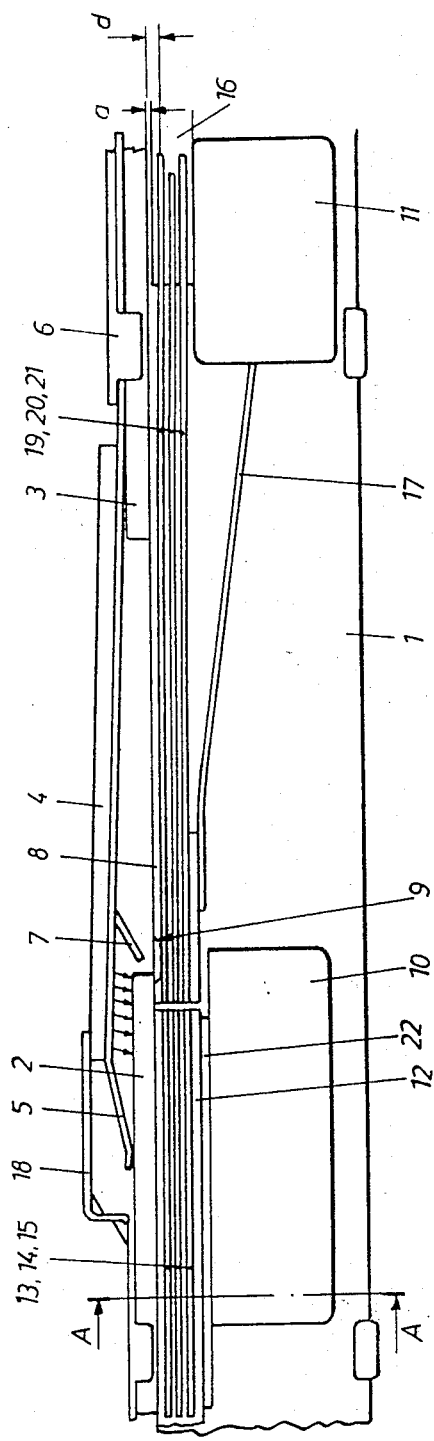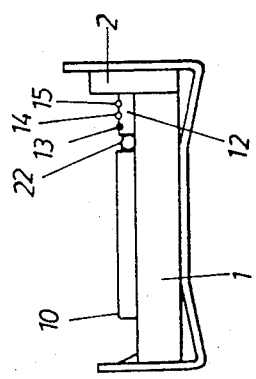

FIBRE-OPTIC SWITCHING MEANS

FIELD OF THE INVENTION

The present invention relates to a fibre-optic switching means having a relay and containing fibre-optical conductors for switching optical signals passing through a first plurality of parallel fibres to a second plurality of parallel fibres. Such a switching means is used, for example, in a loop system in the connection point between the fibre loop and the bus terminal.

BACKGROUND

In fibre optical transmission systems there occurs the problem of being able to switch the signals passing through one or more optical fibres to another optical fibre or fibres with the least possible attenuation. Analogous with conventional signal transmission fibre-optical relays have therefore been designed to provide for this type of switching. Fibre-optical relays are known in the art, one such being described in the British Pat. No. 1,580,109. This relay has a substrate which is formed with two grooves for clamping two optical fibre ends, and with a cavity in which one of the fibres extends so that its end portion can move laterally to assume two different positions under the action of a magnetic field. In one position the movable fibre end is optically coupled to the fixedly arranged fibre end, while in the other position the fibre ends are disconnected. A third fibre end may possibly be fixed such that in the second position it is connected to the first movable fibre end. Switching between two optical signal parts may thus take place.

SUMMARY OF THE INVENTION

In the design of a fibre-optical switching means in the form of a relay, the following factors must be taken into account:
1. Small deviation between the center lines of coacting fibres. "Coacting fibres" in this context means the two fibres which will transmit the same optical signal before and after switching.
2. Small angular error between the center lines of coacting fibres.
3. Small distance between the end surfaces of coacting fibres.

It has been found by experience that the deviation according to item 1 has the greatest effect on the attenuation of signals between coacting fibres, while the angular error according to item 2 has less, and the distance according to item 3 has the least effect. The switching means in accordance with the present invention has therefore been constructed, bearing in mind this situation.

An object of the present invention is thus to provide a fibre optical switching means for switching a first plurality of fibres relative to a second plurality of fibres, such means primarily meeting the demand for small deviation and small angular error between the center lines of coacting fibres so that attenuation can be kept as low as possible.

The invention satisfies the object by providing an arrangement of a movable slide to which the optical fibres are attached, the fibres running parallel to a fixed holder in the switching means, and the opposed fibre ends fixedly arranged at the place of switching being fibres with the same properties and dimensions as those in the movable slide.

BRIEF DESCRIPTION OF DRAWINGS

The invention will now be described in detail with reference to the accompanying drawing where FIG. 1 is a diagrammatic view from above of the switching means in accordance with the invention, FIG. 2 illustrates the switching means taken along cross section A—A in FIG. 1.

DETAILED DESCRIPTION OF BEST MODES FOR CARRYING OUT THE INVENTION

Figure 3:
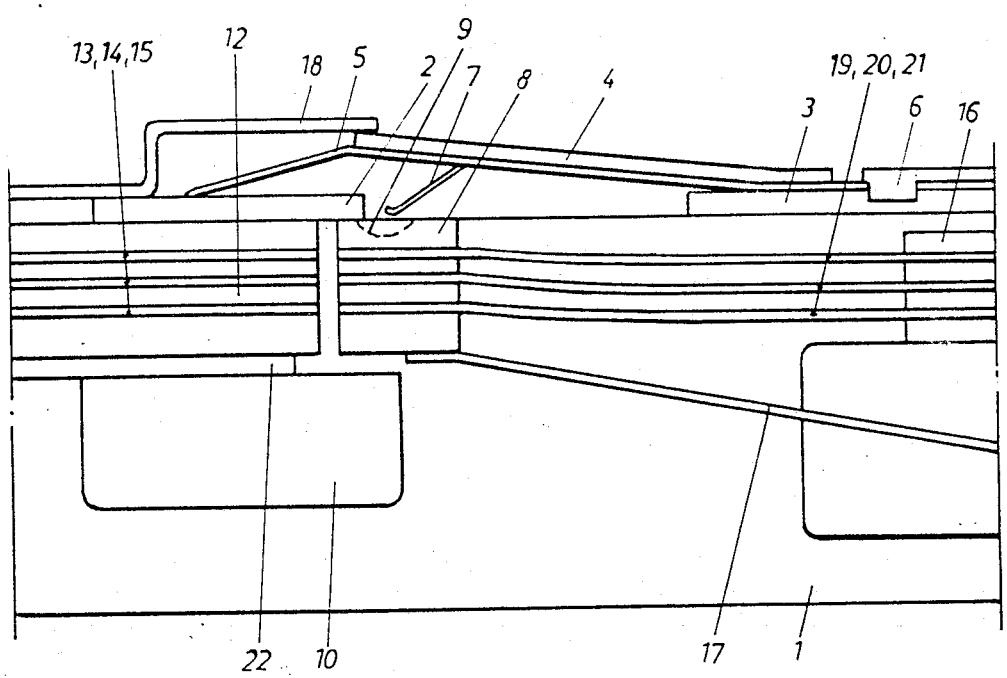
FIG. 3 shows in more detail an embodiment of the switching portion in one position of the switching means according to FIG. 1.

FIG. 1 is a diagrammatic view as seen from above of the switching means in accordance with the invention. The switching means includes a relay with fibre-optical conductors which are to be switched between two positions, as will be seen from FIGS. 3 and 4. According to FIG. 1 the relay is built up on a bottom plate 1, which has two iron cores 2 and 3 attached to its one long side. An armature 4 of magnetic material (soft iron) is attached to an armature spring 5 which is non magnetic. The spring 5 runs between the soft iron parts (the iron cores) 2 and 3 and is mounted on the core 3, which is provided with two projecting bosses. These run through two holes (not shown) in the spring 5. A first stirrup 6 engages against the right-hand portion of the armature spring 5 and prevents it from coming away from the core 3 after assembly. A second stirrup at the iron core 2 is provided with a tongue 18 which constitutes a stop for the armature in its non-energized position (according to FIG. 1). Since the armature spring 5 is placed between the armature 4 and core 2 it will constitute a pole plate for the magnetic flux flowing between core 3, armature 4 and core 2 (illustrated in the Figure by arrows). The flux is generated conventionally by an unillustrated coil magnetizing an iron circuit in which the magnet cores 2, 3 and the armature 4 are included. The free portion of the armature spring 5 projecting over the core 2 from the armature 4 provides the armature the armature with a suitable switching-off force.

A holder 12 is attached, e.g. by an adhesive, on the bottom plate 1. One side surface of the holder engages against the core 2, see FIG. 2, and along its other side surface there is a spacer wire 22 of a given diameter, which is in contact with a guide plate 10 as well as a side surface of the holder 12, the plate 10 being in the shape of a metallic plate with a rectangular cross section. Longitudinal grooves are cut conventionally (for example according to the Swedish Patent Application 8204086-6) in the upper surface of the holder 12, and three optical fibres 13, 14 and 15 are fixed in the grooves.

A movable slide 8 of the same configuration as the holder 12 is placed between the portion of the core 2 projecting to the in right FIG. 1 and the guide plate 10. The slide can glide with a certain friction in a transverse movement substantially perpendicular to the axial direction of the fibres 13, 14, 15. As with the holder 12 there are longitudinal grooves cut in the upper surface of the slide 8 for fixing three optical fibres 19, 20 and 21. These fibres extend to the right in the Figure, past the righthand edge of the slide and are fixed to a fixed holder 16, one edge surface (the lower one in FIG. 1) engages against the edge surface of a second guide plate 11. As seen in FIG. 1 these fibres having a diameter a and a spacing distance d. The movable slide 8 is kept in place in its initial position in FIG. 1 with the aid of a return spring 17. The spring 17 engages against an unillustrated stop on the underside of the slide 8 and also provides the slide with a force downward towards the bottom plate 1.

The position of the fixed holder 16 is selected such that when the slide 8 is in its upper position in FIGS. 1 and 3, the fibre ends in the slide are displaced half the spacing d/2 of the fibres in relation to the positions of the same fibres in the holder 16, i.e. the distance=half the fibres spacing d. This is providing that the holder 16 is of the same design as the slide 8.

The armature spring 5 is provided with an actuating arm in the shape of a lifting tongue 7 for pusing the slide ahead of it so that the latter executes a movement at right angles to the axial direction of the fibres for the switching process. The bottom plate 1 is provided with a recess 9 to enable the movement of the actuating arm.

Figure 4:
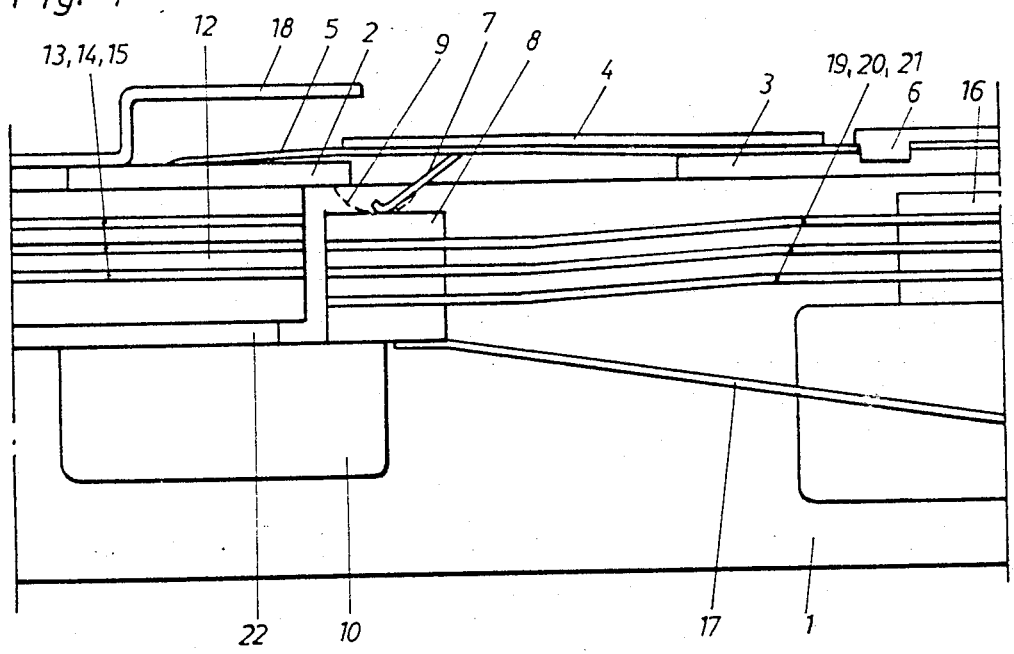
FIG. 4 illustrates the same embodiment as in FIG. 3 in the other switching position.

A magnetic flux occurs when the cores 2 and 3 are magnetized, this flux causing a force between the armature 4 and core 2. The armature 4 approaches the core 2, whereon the tongue 7 comes into contact with the movable slide 8. The tongue 7 will push the slide 8 ahead of it so that the latter will come agaist the guide plate 10 and be arrested in its movement at the upper side surface of the guide plate. The armature movement is arrested by the core 2 and the tongue is flexed when the moveable slide is arrested. With the same reference denotations as in FIG. 1, FIG. 4 illustrates the final position of the slide 8 after its movement. As will be seen from FIGS. 3 and 4 the positions of the fibre ends on the slide 8 are displaced by half a fibre spacing d/2 relative to the initial position (FIG. 3) of the same fibres on the holder 16. After switching, the fibre ends on the slide 8 have been displaced half a fibre spacing d/2 relative the positions of the same fibres on the holder 16, but in the opposite direction. Thus, when the switching operation is carried out there is obtained a movement of plus and minus half a fibre spacing about an imaginary symmetry line through the holder 16.

The spacer wire 22 has a diameter which is exactly equal to the fibre spacing d and conventionally determines the position of the side surface of the guide plate 10 which is directed towards the slide 8. In the other position of the slide, according to FIG. 4, both fibre ends 19 and 20 will accordingly be in register with the fibre ends 14, 15 on the holder 12.

For minimizing the deviation between the center lines of the fibres, according to item 1 above, lengths of fibre from the same original fibres are used in the holder 12 and the movable slide 8. The guide grooves in the holder 12 and movable slide 8 have been machined to the same dimension and the bottom plate 1, as well as the movable slide 8 have a very good degree of flatness. The return spring 17 presses the movable slide 8 against the bottom plate 1. A guarantee is obtained bby these measures for small variation in one direction between the center lines of coacting fibres. In a second direction at right angles to that just described, this is achieved by the movable slide 8 in one end position being pressed against the same core 2 as the holder 12 and in its other (energized) position it is pressed against the same surface of the guide plate 10, which has been placed conventionally precisely one spacing d beyond the edge of the holder 12. The widths of the holder 12 and the slide 8 are equal and the spacing d between the fibres in the holder 12 and slide 8 and the distance from a fibre to the outer edges of the holder and slide are just as great. As a result, the center lines should practically coincide.

For providing a relay with small angular error between the center lines of the fibres, according to item 2 above, a first step has been to try out the free length of the fibres from the fixed holder 16 to the movable slide 8. By arranging the fibres 19, 20, 21 as in FIG. 1, i.e. parallel to each other and fixed partly in the fixed guide 16 and partly in the movable slide 8, in accordance with the invention, there is obtained an S-shaped parallel movement of the fibres in the movable slide when the relay is energized which minimizes the angular error between the center lines of coacting fibres. The spacing between fibres 19, 20, 21 is made small to reduce the angular error, and the fixed holder 16 is placed such that the center lines of the fibres in this detail are halfway between the positions the center lines of the fibre ends will assume in the unenergized and energized positions.

In the embodiments according to FIGS. 1-4 there have been shown three (longitudinal) fibres which are reconnected by the relay. The invention is, of course, not limited to this number of fibres. For example, only one fibre 13 may be fixed to the holder 12 and only one fibre 19 fixed to the slide 8 and the holder 16, these fibres being in registry in one switching position. For the relay to perform its intended function, a further fibre or flexible wire (a filamentary means) 21 must be attached to the slide 8 and holder 16 however, so that the S-shaped parallel movement described above of the fibre plus wire will be obtained in the switching process. In this latter embodiment there is an interruption of the signal path through the respective fibre 13, 19 when switching occurs.

To provide for a small distance between the end surfaces of the coacting fibres, according to item 3 above, an aligning means (not shown) is used on assembling the relay to facilitate setting up the fibres axially.

By the methods described here a uniform quality of signal transmission is obtained and desired good technical performance can be obtained at a reasonable cost.

What is claimed is:

1. A fibre-optical switching apparatus for switching the optical path between optical fibres comprising a first fixed fibre holder for holding at least a first optical fibre along an axis with an end of the fibre aligned with an end of the holder, first and second stop means, said first fixed fibre holder being arranged between said stop means, a slide movable in a direction transverse to the axis of said first optical fibre, a second optical fibre supported along an axis by said slide with an end of said second optical fibre adjacent adjacent said end of said first optical fibre, magnetically activated actuation means for moving said slide in a plane parallel to the axes of said optical fibres between first and second positions whereby said ends of said first and second optical fibres can switch between face-to-face relationship and transversely displaced relationship, said slide being limited in its travel by said first and second stop means, a filamentary means fixed in said, slide, said filamentary means being parallel to, and transversely displaced from said second optical fibre, and a second fixed fibre holder axially spaced with respect to said slide and engaging said second fibre and filamentary means such that said filamentary means and said second optical fibre lie in a plane parallel to said slide plane and during the transverse movement of said slide said second optical fibre and said filamentary means are fixed into an S-shaped form in at least one of said first and second positions whereby the slide is given a movement substantially parallel to said ends of said fibres.

2. The apparatus of claim 1 wherein said filamentary means is a wire.

3. The apparatus of claim 1 wherein said filamentary means is another optical fibre.

4. A fibre-optical switching apparatus for switching the optical path between optical fibres comprising a first fixed fibre holder for holding at least a first optical fibre along an axis with an end of the fibre aligned with the end of the holder, said first fixed fibre holder being arranged between said stop means, a slide movable in a direction transverse to the axis of said first optical fibre, a second optical fibre supported by said slide along an axis with an end of said second optical fibre adjacent said end of said first optical fibre, magnetically activated actuation means for moving said slide in a slide plane parallel to the axes of said optical fibres between first and second positions whereby said ends of said first and second optical fibres can switch between face-to-face relationship and transversely displaced relationship, a filamentary means fixed in said slide, said filamentary means being parallel to, and transversely displaced from said second optical fibre, and a second fixed fibre holder having the same implementation as said slide and displaced a given axial distance therefrom, said second fixed fibre holder supporting said filamentary means and said second optical fibre in a plane parallel to said slide plane such that during the movement of said slide said second optical fibre amd said filamentary means are fixed into an S-shaped form in at least one of said first and second positions whereby the slide is given a movement substantially parallel to said ends of said fibres, the position in the transverse direction of the fibres being such that the center line of said second holder is substantially parallel to the center line of said first holder but displaced half a fibre spacing therefrom.

5. The apparatus of claim 4 wherein said filamentary means is a wire.

6. The apparatus of claim 4 wherein said filamentary means is another optical fibre.

7. In a fibre-optical switching means for switching, i.e. making, breaking or changing an optical signal path between at least one other fibre end (13, 14, 15) fixedly arranged in a first fixed holder (12) and at least one, transversely movable fibre end (19, 20, 21), magnetically activated actuating means (4, 7) for switching between a first and second switching position in response to a magnetizing current, the improvement wherein said at least one movably arranged fibre end (19, 20, 21) is fixed in a second fixed holder (16) and in a slide (8) that is movable relatively to and in close contact with a ground (1), and, if there is only one movable fibre end, in parallel to this movable fibre end (19) and in the plane of movement there is also a wire (20) fixed in the second fixed holder (16) and in the slide (8), and, if there are more than one movable fibre end, said wire is a further movable fibre, all fibre ends (19,20,21) being fixed in parallel and in the plane of movement in the second fixed holder (16) and in the slide (8), a spring (17) acting on the slide (8) against the force of said magnetically activated means (4,7), such that said at least one movably arranged fibre end (19,20,21) pg,14 is forced into an S-shaped form in at least one of said switching positions, whereby the portion of said at least one movably arranged fibre end (19, 20, 21) that is fixed in the slide (8) will remain substantially parallel to said at least one fibre end (13, 14, 15) fixedly arranged in the first fixed holder (12) during the movement of the slide.

8. Switching means as claimed in claim 7, wherein the first fixed holder (12) is arranged between two stop means (2, 10) forming limiting surfaces for the slide movement.

9. Switching means as claimed in claim 7, wherein the slide (8) is of a rectangular form and of the same implementation as the first fixed holder (12), and has a center line coinciding with the center line of the first fixed holder (12) in the first switching position.

10. Switching means as claimed in claim 7, wherein the second fixed holder (16) is placed at a given distance from the movable slide (8) and is of the same implementation as said movable slide, the position of the second fixed holder (16) in the transverse direction of the fibres being such that its center line is substantially parallel to the center line of the first fixed holder (12), but displaced half a fibre spacing (1) relative to said center line.

* * * * *